United States Patent [19]

Kanesaka

[11] Patent Number: 4,502,282
[45] Date of Patent: Mar. 5, 1985

[54] TURBO-CHARGED COMPRESSION IGNITION ENGINE OPERABLE AT SMALL COMPRESSION RATIO

[75] Inventor: Hiroshi Kanesaka, Kawasaki, Japan

[73] Assignees: Usui Kokusai Sangyo Kabushiki Kaisha, Sunto; Kabushiki Kaisha Kanesaka Gijutsu Kenkyusho, Kawasaki, both of Japan

[21] Appl. No.: 513,868

[22] Filed: Jul. 14, 1983

[51] Int. Cl.³ .............................................. F02B 37/00
[52] U.S. Cl. ...................................... 60/602; 60/606; 60/611
[58] Field of Search .................. 60/600, 601, 602, 603, 60/606, 611

[56] References Cited

U.S. PATENT DOCUMENTS

| 3,015,934 | 1/1962 | Miller | 60/601 |
| 4,138,849 | 2/1979 | Wilber | 60/602 |

FOREIGN PATENT DOCUMENTS

| 2151658 | 4/1973 | Fed. Rep. of Germany | 60/602 |
| 2820941 | 11/1978 | Fed. Rep. of Germany | 60/602 |
| 2751987 | 5/1979 | Fed. Rep. of Germany | 60/606 |
| 2284040 | 4/1976 | France | 60/606 |

Primary Examiner—Douglas Hart
Attorney, Agent, or Firm—Anthony J. Casella; Gerald E. Hespos

[57] ABSTRACT

A turbo-charged compression ignition engine having a turbo-charger (40) for supercharging the engine, a mechanism (56, 59) for controlling the timing of closing of the inlet passage (42) of the engine, and an auxiliary cam for opening the exhaust valve of the engine at a point near the bottom dead center in the suction stroke. The area of the nozzle of the turbine of turbo-charger is controllable by a rotor-type mechanism (69). A passage formed in the rotary-type mechanism opens to the downstream side of this mechanism. The passage is communicated with the inlet pipe of the engine through a passage (42a).

11 Claims, 13 Drawing Figures

TURBO-CHARGED COMPRESSION IGNITION ENGINE OPERABLE AT SMALL COMPRESSION RATIO

BACKGROUND OF THE INVENTION

1. Field of the Invention

The present invention relates to a turbo-charged compression ignition engine of low compression ratio type.

2. Description of the Prior Art

It is well known that combustion pressure, and hence, output power of an engine are increased as supercharging pressure is increased so that the maximum power output of the engine is determined by the maximum allowable pressure.

It is possible to increase the power, while maintaining the maximum combustion pressure below the maximum allowable pressure, by decreasing the compression ratio. This, however, leads to problems such as difficulty in starting the engine, misfire during light-load operation and so forth. In the case of a diesel engine which is designed to operate at a compression ratio of around 8:1, it is possible to obtain a mean effective pressure of about 32 Kg/cm$^2$. In the misfire region shown hatched in FIG. 1 of the accompanying drawings, however, the level of the load imposed on the engine is low so that the turbo-charger cannot exert its power. As a result, the pressure and temperature of the induced air are lowered so that the desired ignition temperature is not reached in the compression stroke. In such a case, white or blue smoke having an offensive smell is discharged from the exhaust side of the engine and the engine finally becomes inoperative due to misfiring.

In order to obviate this problem, two countermeasures have been proposed: namely, a variable compression type method and a hyperber method. These countermeasures are, however, used only in weapons because the former requires a complicated control mechanism while the latter suffers from an impractically large drop in thermal efficiency.

SUMMARY OF THE INVENTION

Accordingly, it is a primary object of the invention to provide a turbo-charged compression ignition engine which can operate in a stable manner even at a low compression ratio, thereby avoiding the above-described problems of the prior art.

To this end, according to the invention, there is provided a turbo-charged compression ignition engine comprising a turbo-charger for supercharging said engine and means for controlling the timing of closing of an inlet passage of said engine; opening means for opening an exhaust valve of said engine at a point near the bottom dead centre in the suction stroke; means for varying the area of a nozzle in the turbine of said turbo-charger and which defines a passage openable to the downstream side of said means, and an inlet pipe communicating the said passage.

BRIEF DESCRIPTION OF THE DRAWINGS

A compression ignition engine in accordance with the invention will now be described by way of example with reference to the accompanying drawings, in which.

DESCRIPTION OF THE PREFERRED EMBODIMENT

Figure 2:
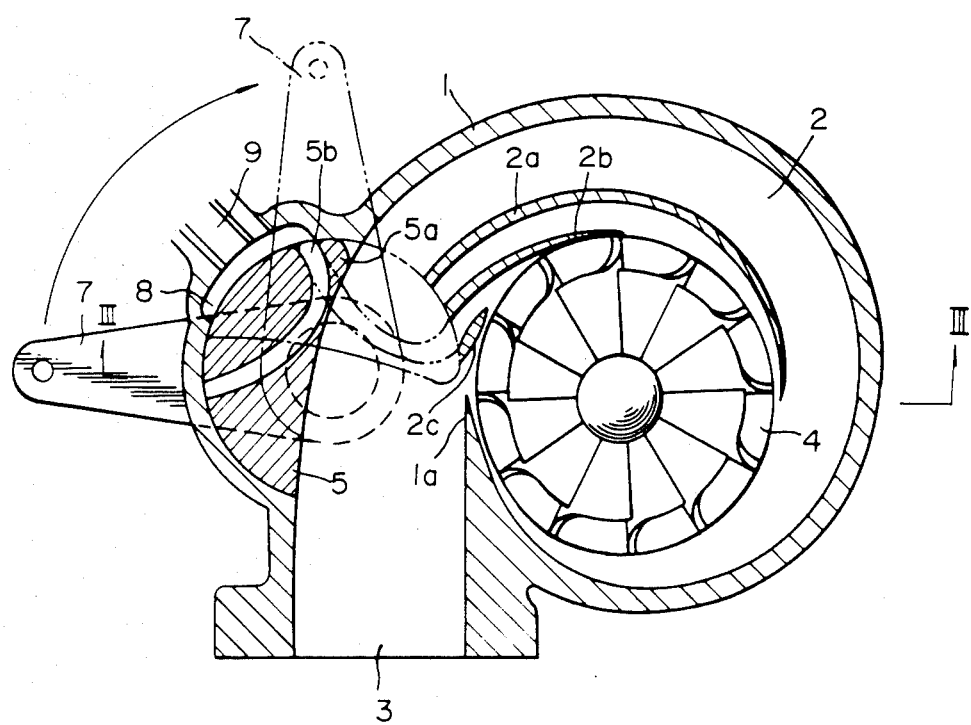
FIG. 2 is a sectional view of an exhaust turbine of a turbo-charged engine in accordance with the invention.
Figure 3:
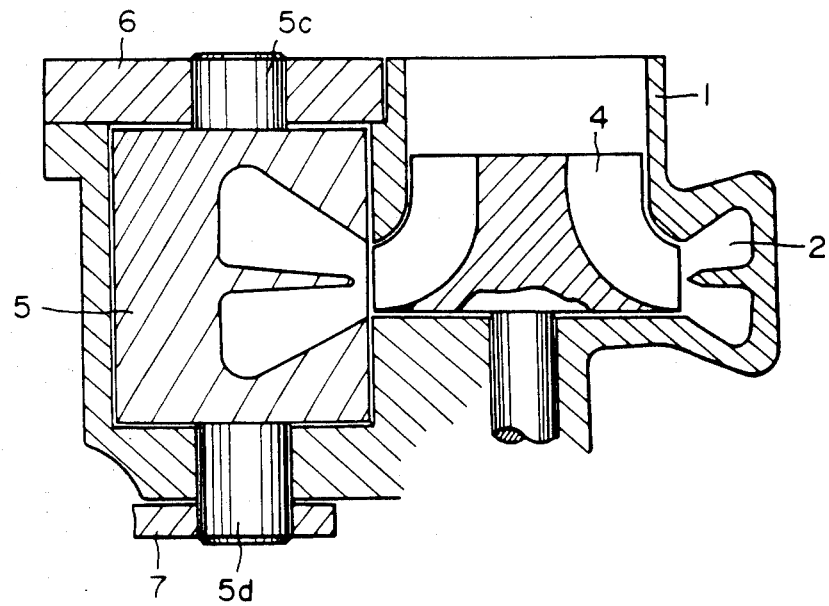
FIG. 3 is a sectional view taken along the line III—III of FIG. 2.
Figure 4:
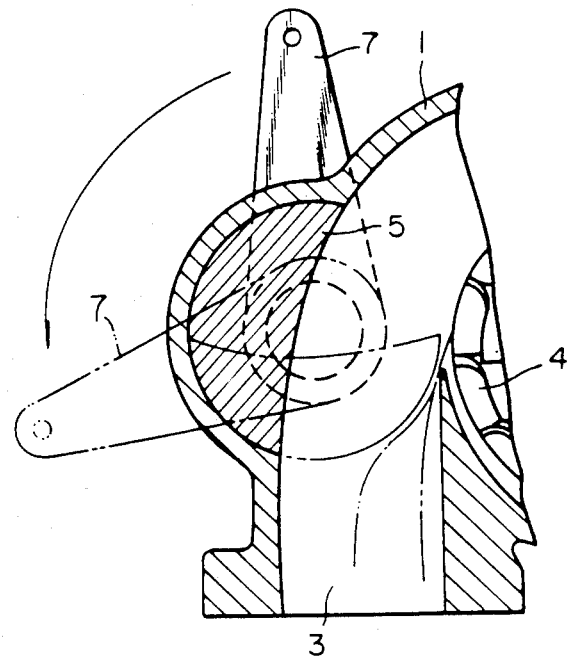
FIG. 4 is a sectional view of part of the exhaust-turbine similar to FIG. 2.

Referring to FIGS. 2 to 4, a turbine casing 1 of a turbo-charger has a nozzle 2 which is provided with a plurality of nozzle vanes of a fluid-dynamical profile. In the illustrated embodiment, the nozzle 2 has three nozzle vanes 2a, 2b and 2c. Exhaust gas coming from an exhaust gas inlet 3 is accelerated and orientated as it flows through the nozzle 2 and then drives a turbine 4.

A rotor 5 is provided with shafts 5c and 5d (see FIG. 3) which are rotatably supported in bearings by the turbine casing 1 and a cover 6. A lever 7 is fixed to the shaft 5c. When the lever 7 occupies a position shown in full lines, the rotor 5 also occupies a position illustrated in full lines. The nozzle 2 can be of conventional construction.

As the lever 7 is rotated clockwise as indicated by an arrow in FIG. 2, the rotor 5 is also rotated to move one end 5a thereof into the nozzle 2 thereby to reduce the nozzle area. In consequence, the pressure at the exhaust inlet 3, i.e. the exhaust pressure of the engine, is increased to increase the velocity of the gas flowing in the nozzle 2, thereby to increase the power output of the turbine 4. As a result, the driving power for driving the compressor is increased to elevate the charging air pressure.

As the lever 7 is rotated to the position shown by a chain line in FIG. 2, the end 5a of the rotor 5 can be moved to the illustrated position to form a nozzle of an extremely small area. In this state, the turbine efficiency is low and the pressure at the tubine inlet is much higher than the pressure at the compressor outlet.

Figure 5:
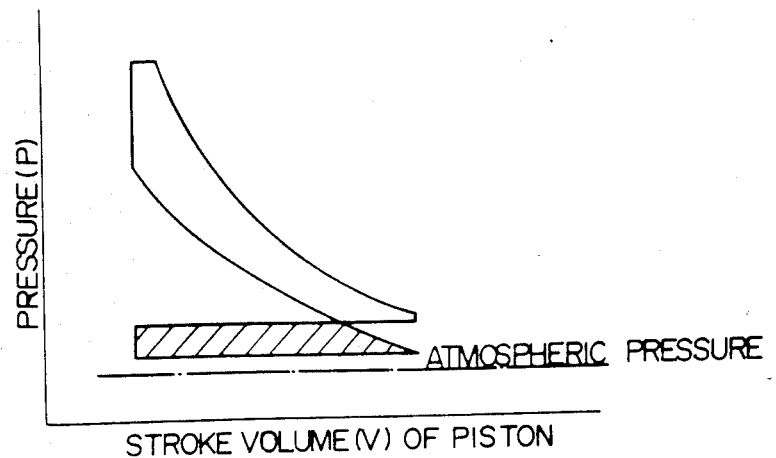
FIG. 5 is a PV diagram.

As will be understood from the P-V diagram of FIG. 5, the engine has to produce work corresponding to the hatched area for expelling the exhaust gas so that the fuel consumption is inevitably increased. In the low-speed and light-load operational condition of the engine, this work is essential for operating the turbo-charger, and the charging pressure can be increased at a cost of reduction in the thermal efficiency.

The rotor 5 is provided with a passage 5b which is kept closed during normal operation as shown in FIG.

2. The nozzle area, however, is decreased as the rotor 5 is rotated clockwise. At the same time, the passage 5b provides a communication between the nozzle 2 and a passage 8 which is connected to the compressor outlet of the turbo-charger through a connection port 9 shown by chain line.

In the high-speed no-load operation of the engine, the work corresponding to the hatched area in FIG. 5, i.e. the negative work, can be utilized as an exhaust brake.

FIG. 4 shows a state in which the rotor 5 has been rotated counter-clockwise. As will be understood from the Figure, the rotor in this position produces the same effect as that produced when the same is rotated clockwise.

The turbo-charger of the invention can maintain a high charging pressure even when the flow rate of air is small, by an efficient use of the high gas pressure at the turbine inlet. As will be detailed later, it is possible to prevent misfire during light-load operation, by making an efficient use of this feature.

Figure 6:
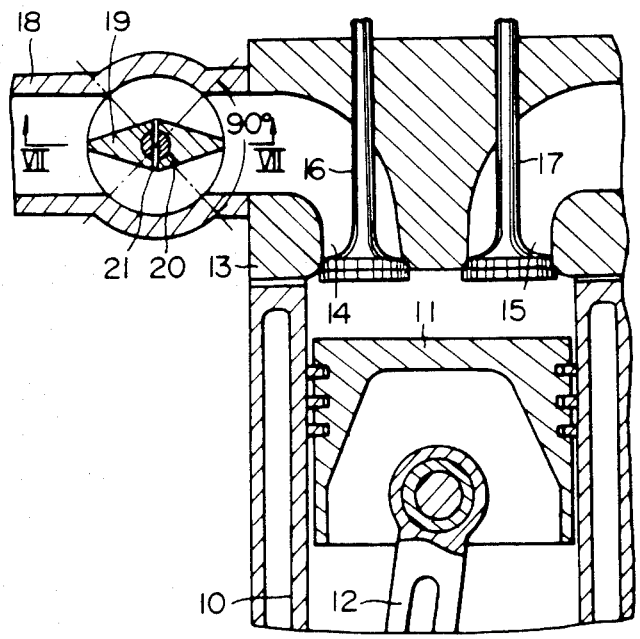
FIG. 6 is a sectional view of a part of a 4-stroke cycle engine in accordance with the invention.

FIG. 6 shows a 4-stroke cycle turbo-charged compression ignition engine in accordance with the invention. The engine has a plurality of cylinders 10 (only one of which is shown) each slidably and reciprocally receiving a piston 11 which is pivotally connected to the upper end of a piston rod 12. The lower end of the piston rod 12 is connected to a crankshaft (not shown). The cylinder 10 carries a cylinder head 13 in which are formed an inlet port 14 and an exhaust port 15. An inlet valve 16 and an exhaust valve 17 are arranged in the port 14 and 15, respectively.

A rotary valve 19 is disposed in an inlet pipe 18 connected between the inlet port 14 and the turbo-charger (not shown in this Figure). The rotary valve 19 is driven by the crankshaft of the engine through a gear mechanism so as to serve as a control valve, an example of such a mechanism being explained below with reference to FIG. 7.

The rotary valve 19 is fixed by a pin 21 to a drive shaft 20 and is clamped between sleeves 22 and 23 on the shaft 20. A further sleeve 24 is also carried by the drive shaft 20. The drive shaft 20 is rotatably supported by ball bearing as assemblies 25, 26 and 27 disposed respectively between the sleeves 22, 23 and 24 and the wall of the inlet pipe 18.

A rotary shaft 32 is rotatably supported by a frame 28 through ball bearing assemblies 29 and 30, and is adapted to be driven by a timing gear 31 which is connected drivingly to the crankshaft (not shown) through a gear mechanism. The drive shaft 20 is connected to the rotary shaft 32 through an adjusting member 33 constituting a means for adjusting the opening and closing timings.

Figure 9:
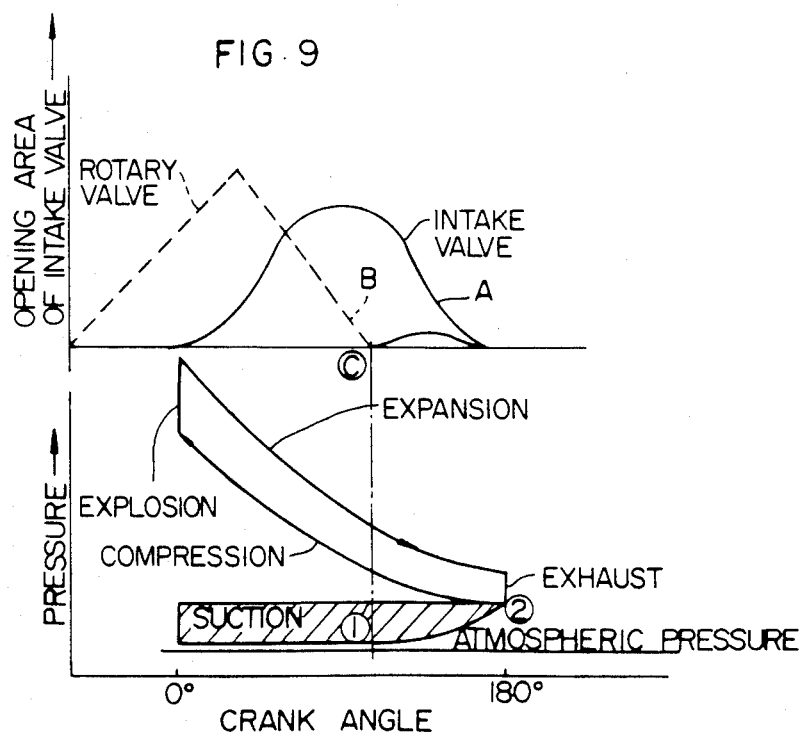

As will be seen from FIG. 9, the rotary valve 19 is designed to open and close at an interval of about 90°. The rotary valve 19 is driven at a speed which is a half of the speed of the crank shaft.

On the other hand, the period of the suction stroke of the engine is about 180° in terms of the crank angle. Therefore, the rotary valve 19 has an opening period of about 180° in terms of the crank angle as in the case of the inlet valve 16.

An explanation will be made below as to the construction of means for adjusting the opening and closing timings of the rotary valve 19, with specific reference to FIG. 7.

The opposing ends of the drive shaft 20 and the rotary shaft 32 are provided with helical splines 20a and 32a of opposite hand. The splines 20a and 32a engage with projections formed on the inner peripheral surface of the adjusting member 33. The arrangement is such that, as the adjusting member 33 is moved axially in one direction, the drive shaft 20 makes an angular displacement in a predetermined direction with respect to the rotary shaft 32, while movement of the adjusting members 33 in the opposite axial direction causes an opposite angular displacement of the drive shaft 20. It is thus possible to change the timing of rotation of the drive shaft by the movement of the adjusting member 33, thereby to adjust the opening and closing timings of the rotary valve 19.

The axial movement of the adjusting member 33 is caused by rocking movement of an adjusting lever 34 having one end located in an annular retaining groove 33a formed in the outer peripheral surface of the adjusting member 33. The adjusting lever 34 is supported rockably by a shaft 35. The other end of the lever 34 is operatively connected to a control mechanism (not shown in FIG. 7).

An explanation will be made hereinunder as to the operational timing of the inlet valve 16 and the rotary valve 19, with reference to FIGS. 8 and 9, as well as the P-V diagram.

Figure 8:
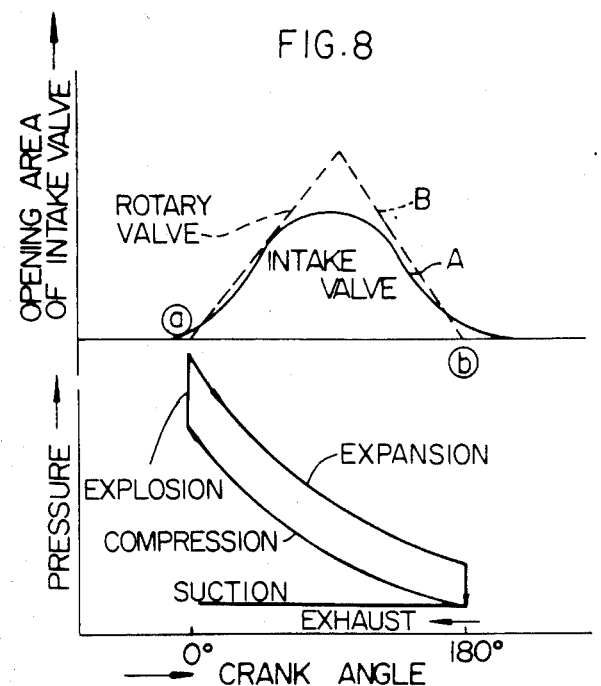
FIGS. 8 and 9 are graphs showing how the opening area of the intake valve and the pressure in the cylinder are changed in relation to the crank angle.

In FIGS. 8 and 9, full-line curves A in the upper part of the charts show the lift or opening area of the inlet valve 16 in relation to the crank angle of the engine, whereas the broken-lines B show how the opening angle or opening area is changed.

In the full-load operation of the engine as shown in FIG. 8, both the inlet valve 16 and the rotary valve 19 start to open in the initial period of the suction stroke at around a point (a) near the suction top dead centre. In the final period of the suction stroke, both of the inlet valve 16 and the rotary valve 29 start to close at a point near the point (b). The P-V diagram in the full-load operation is thus identical to that attained in the conventional engine.

As shown in FIG. 9, during the light-load operation to which the invention pertains, the rotary valve 19 starts to open as shown by the broken-line curve B in advance to the opening of the inlet valve 16, by the axial movement of the adjusting member 33 through the action of the adjusting mechanism which will be explained later. Thus, no suction occurs as the rotary valve 19 initially opens because the inlet valve 16 is still closed at that moment. When the inlet valve 16 starts to open, the rotary valve 19 is almost fully open and at an intermediate point (c) of the suction stroke, the rotary valve 19 closes. The inlet valve 16 closes at the end of the suction stroke near the bottom dead centre of the stroke of the piston 11.

When the inlet valve 16 starts to open in the initial period of the suction stroke, the rotary valve 19 has been opened fully so that the air is introduced to the cylinder 10. At an intermediate point (1) of the suction stroke, however, the rotary valve 19 is closed as will be seen from the curve in the lower part of FIG. 9, as will be understood from the comparison with the broken-line B.

Figure 7:
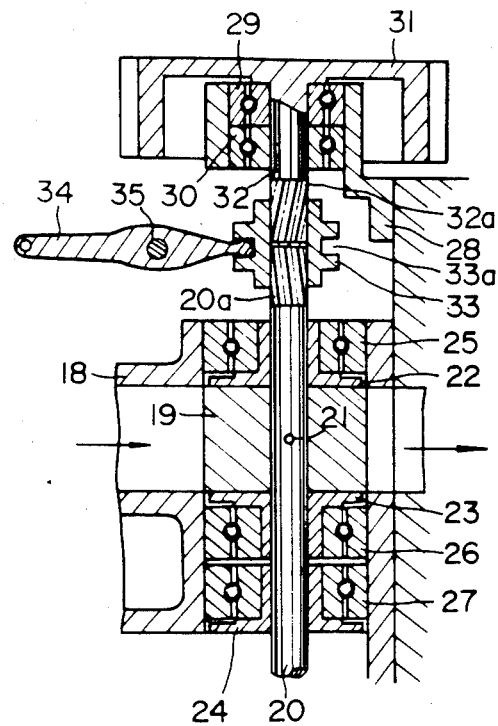
FIG. 7 is a sectional view taken along the line VII—VII of FIG. 6.

At this moment, the exhaust valve designated at 17 in FIG. 7 is opened by the action of an auxiliary exhaust cam which will be explained later in connection with FIG. 10, so that the hot exhaust gas of a pressure elevated by the turbo-charger starts to be drawn into the cylinder. The exhaust gas is introduced only during the period between the points (1) and (2) shown in FIG. 9.

In this state, the inlet passage has been closed by the rotary valve 19 so that the exhaust gas of high-pressure and high-temperature does not escape to the inlet side of the engine. The high pressure exhaust gas introduced into the cylinder heats and pressurises the air in the cylinder 10 to form a mixture having an extremely high temperature and pressure at the point (shown at 2 in FIG. 9) of commencement of the compression stroke. At this moment, both of the inlet and exhaust valves 16 and 17 are closed to ensure ignition which will take place at the end of the compression stroke now commenced.

Figure 10:
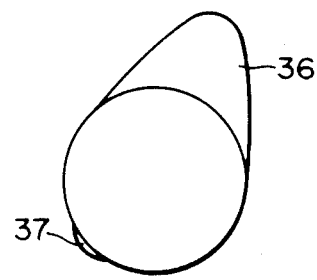
FIG. 10 is a front elevational view of a cam.

FIG. 10 shows a known exhaust cam incorporated in the engine of the invention. The cam has two cam portions: namely, a main cam 36 and an auxiliary cam 37. The main cam 36 has the same function as the ordinary exhaust cams to open the exhaust valve 17 during the exhaust stroke, while the auxiliary cam 37 has a function to open the exhaust valve 17 at a moment near the bottom dead centre in the suction stroke as will be seen from FIG. 9.

An explanation will be made below as to the construction and operation of a turbo-charged compression ignition engine in accordance with the invention designed to operate even at a low compression ratio.

Figure 11:
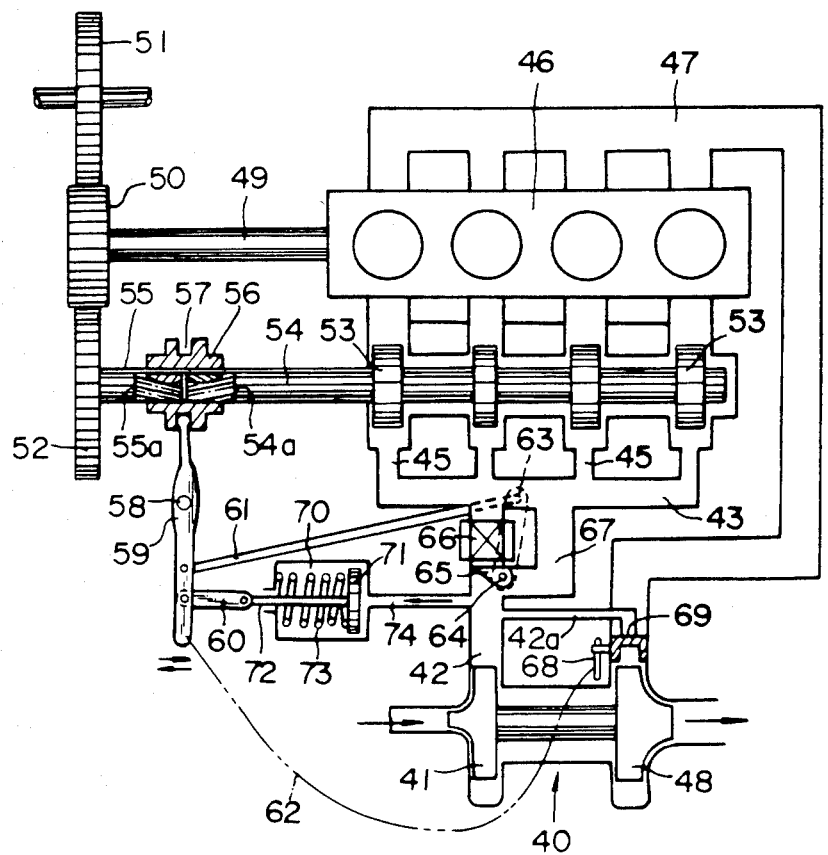
FIG. 11 is a diagrammatic illustration of a turbo-charged compression ignition engine in accordance with the invention.

Referring to FIG. 11, the compressed air or mixture discharged from the compressor 41 of the turbo-charger 40 is introduced into the cylinders of the engine (indicated at 46) through an inlet pipe 42, intake manifold 43, air cooler and branch pipes 45. The exhaust gas emitted from the engine 46 acts on an exhaust turbine 48 (of the same type as the turbine 4 shown in FIGS. 2 to 4) of a turbo-charger 40, through an exhaust pipe 47. The exhaust turbine 48 is provided with a variable area nozzle of the type shown in FIGS. 2, 3, and 4. The exhaust gas then drives the turbine and is expanded to the atmospheric pressure before it is relieved to the atmosphere.

A drive shaft 49 connected to one end of the crankshaft rotates as a unit with the latter as the engine 46 operates. The drive shaft 49 carries at its one end a gear 50 which meshes and drives a timing gear 51 for driving various devices such as a cam shaft carrying the exhaust cam 36 shown in FIG. 10, fuel injection pump and so forth. The gear 50 meshes also with the drive gear 52 for driving the rotary valve serving as a control valve. The gear 50 drives the drive gear 52 at a speed which is a half of that of the crankshaft speed.

Rotary valves 53 of the two-blade type similar to the rotary valve 19 shown in FIG. 6 are disposed in the intake branch pipes 45 leading to the inlet ports of the cylinders of the engine 46 or within the inlet ports. These valves are carried by a common drive shaft 54. The operation timings of the rotary valves 53 are adjusted by a mechanism substantially identical to that explained before in connection with FIG. 7. The mechanism comprises a rotary shaft 55 adapted to rotate as a unit with the drive gear 52 disposed coaxially with the drive shaft 54 and is connected to the latter through an adjusting member 56. Helical splines 54a and 55a are formed on the opposing ends of both shafts and are of opposite hand. The helical splines engage projections formed on the inner peripheral surface of the adjusting member 56. The adjusting member 56 is provided in its outer peripheral surface with an annular retaining groove 57 which retains one end of an adjusting lever 59 rockably supported by a shaft 58. The other end of the lever 59 is connected to a link 60, link rod 61 and a flexible cable 62. The link rod 61 is connected at its right end to one end of a lever 63 which is mounted at its other end for pivoting on a shaft 64. The shaft 64 is rotatably supported by the intake pipe 42. A charge-over valve 65 fixed to the other end of the shaft 64 is rockable by means of the shaft 64 between a first position where it permits the charged air to flow through an air cooler 66 and a second position where it makes the air flow through a bypass 67.

The right-hand end of the flexible cable 62 is connected to a lever 68 which is substantially identical to the lever 7 of the nozzle area varying mechanism of the turbine as shown in FIGS. 2 to 4. The rotor 69, which is substantially identical to rotor 5 shown in FIGS. 2 to 4, is rotated by the lever so as to vary the turbine nozzle area. As in the case of the rotor 5, the rotor 69 is provided with a passage similar to the passage 5b shown in FIGS. 2 to 4. This passage is provided with a bypass 42a communicating with the intake passage 42. A cylinder 70 receives a piston 71 to which is connected one end of a piston rod 72 the other end of which is connected to the right-hand end of the link 60.

A spring 73 is disposed between the piston 71 and the cylinder 70 as viewed in the drawings so as to bias the piston towards the right as viewed in FIG. 11. An inlet formed in the right wall of the cylinder 70 as view in FIG. 11 is in communication with the inlet pipe 42 through the pipe 74. The chamber shown at the right side of the Figure, defined by the cylinder and the piston 71, receives compressed air discharged from a compressor 41.

Figure 1:
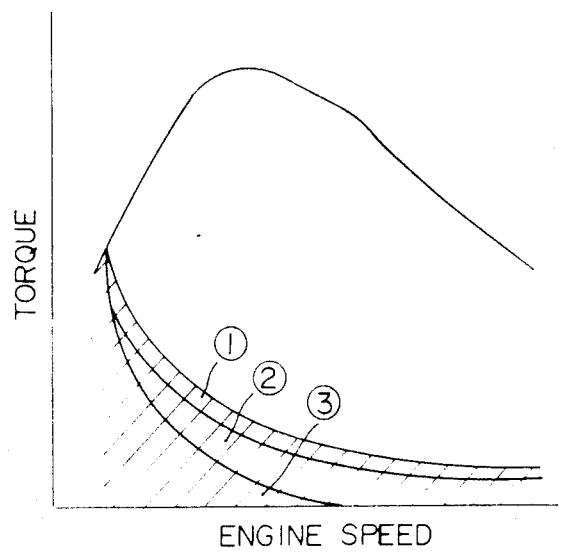
FIG. 1 is a diagram of operational characteristics of a compression ignition type engine, showing particularly the misfire zone region in relation to output torque and engine speed.

The turbo-charger exhibits high performance and efficiency in the ordinary range of operation, i.e. in the area other than the hatched area in FIG. 1. In the ordinary range of operation, therefore, sufficiently high charging pressure and air temperature are attained to provide good engine operational characteristics.

The invention offers advantages particularly in the light-load operation range, i.e. the range as hatched in FIG. 1, as will be understood from the following description.

Usually, the operational characteristics of a turbocharged engine are such that as the load imposed on the engine is decreased, the charging pressure and the air temperature are lowered.

An explanation will be made hereinunder as the misfire region 1 shown in FIG. 1. A pressure reduction in the inlet pipe 42 causes a counter-clockwise rotation of the lever 59 around the axis of the shaft 58 through the action of the piston 71, piston rod 72 and the link 60. In consequence, the lever 63 is rotated clockwise by the link rod 61 which interconnects the lever 59 and the lever 63, so that the change-over valve 65 connected to the lever 63 is moved to the position shown by full-line in FIG. 11 thereby to make the air flow through the bypass 67 detouring the air cooler 66. Thus, in contrast to the case of the heavy-load operation, the reduction of air temperature is suppressed to avoid the misfiring of the engine.

As the air pressure and temperature are further lowered within the misfiring region 2, the piston 71 is further moved to the right to rotate the lever 68 and the rotor 69.

This relationship will be explained in more detail with reference to FIG. 12. In this state of engine operation, the lever 7 has travelled about a half of the whole stroke so that the turbine nozzled area is reduced almost to a half. Then, as the exhaust pressure is increased, the turbine 48 (corresponding to the turbine 4 shown in FIG. 4) is energised to accelerate the compressor 41 so that the discharge air pressure and temperature are raised to prevent misfiring of the engine. The misfiring region 3 shown in FIG. 1 involves the greatest factor which hinders the development of turbo-charged compression ignition engine operable at lower compression ratio.

Figure 12:
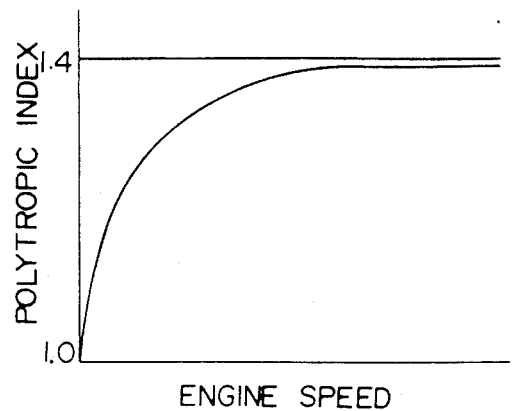
FIG. 12 is a graph showing the relationship between the engine speed and the polytropic index in the compression stroke.

FIG. 12 shows the relationship between the engine speed and the polytropic index in the compression stroke. As will be understood from this Figure, when the engine operates at a low speed, the temperature rise of the compressed air in the cylinder is not made in adiabatic manner but a considerably large amount of heat is lost in each compression stroke.

Figure 13:
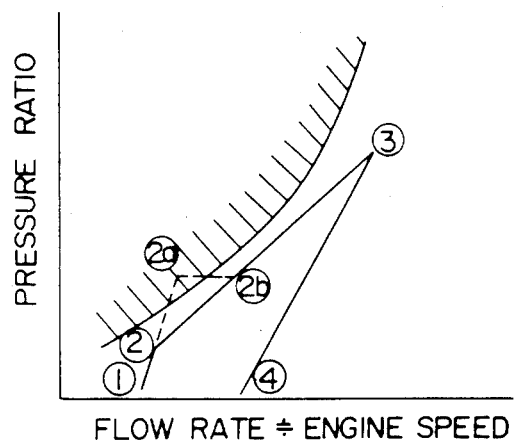
FIG. 13 is a diagram showing the performance of a turbo-charger.

On the other hand, the turbo-charger combined with the engine exhibits a performance as shown by a curve 1-2-3-4 in FIG. 13. More specifically, the point 1 corresponds to an idle state of the engine, while the point 2 shows the pressure ratio as obtained when the engine is operated with full load at the instant speed.

The region 3 is the region in which the compression ratio is low and the polytropic index showing the heat transfer to cylinder and other parts is large so that the temperature rise caused by the compression is small while the turbo-charger is almost ineffective. According to the invention, however, it is possible to prevent misfiring even in this region 3.

A reduction in the charging pressure causes the spring 73 to further urge the piston 71 to the right so that the lever 7 and the rotor 5 of the turbo-charger shown in FIG. 2 are moved to the position shown by two-dot-and-dash line to drastically decrease the nozzle area, by the action of the flexible cable 62 connected to the lever 59.

Consequently, the exhaust pressure is raised to increase the flow velocity of the gas coming out from the nozzle so that the turbine is energized to increase the power for driving the compressor.

However, when the engine speed is low, i.e. when the rate of supply of the air to the engine is small, the compressor cannot provide the air at high pressure ratio because of the presence of the surging region, even though the driving power produced by the gas turbine is large.

In the turbo-charger to which the invention pertains, therefore, the passage 5b in the rotor 5 is made to open at its one end to the passage 8 and its other end to the downstream side of the minimum nozzle area which is defined by one end 5a of the rotor 5 and one end 1a of the casing 1. The passage 8 is connected via a connecting port 9 and through the bypass 42a to the dischrage side of the compressor of the turbo-charger i.e. to the intake pipe 42 shown in FIG. 11, so that a part of the turbine nozzle 2 is brought into communication with the inlet side.

The high exhaust pressure available at the turbine inlet 3 is changed into a kinetic energy as the exhaust gas flows through the nozzle of small area defined between one end 5a of the rotor and one end 1a of the casing 1, so that the pressure of the gas is low at the downstream side of the nozzle.

Since the passage 5b opens to the low-pressure side, it is possible to introduce the air to the exhaust side.

Referring now to FIG. 13, the air of an amount corresponding to the difference between 2b and 2a is made to bypass through the passage 5b (see FIG. 2) so that the compressor 41 operates to compress the air at a rate and pressure shown by 2b averting from the surging region so that the engine sucks the air at a pressure and rate as shown by 2a.

Furthermore, according to the invention, it is possible to prevent emission of white or blue smoke with offensive smell, as well as misfiring, by raising the temperature at the beginning of the compression stroke, as will be understood from the following description.

As stated before, in this state of operation, the efficiency of the turbo-charger is low and the exhaust pressure is increased compared with the charging pressure. In this state, the engine operates under an increased load for overcoming the negative work corresponding to the hatched area in FIG. 9. In consequence, the fuel consumption of the engine is increased and the exhaust gas temperature is also increased.

With this invention, it is possible to raise the air temperature at the beginning of the compression stroke, by making an efficient use of this hot exhaust gas. Namely, in the engine of the invention, the lever 59 shown in FIG. 11 is rotated counter-clockwise as explained before so that the adjusting member 56 engaging one end of this lever is moved to the left. In consequence, the timing of closing of the rotary valve is advanced as shown in FIG. 9.

Concurrently with the closing of the inlet passage by the rotary valve, the auxiliary exhaust cam 37 shown in FIG. 10 is opened at a moment 1 shown in FIG. 9 so that the exhaust gas of high pressure and temperature is made to flow back into the cylinder.

Thus, from the moment 1 to the moment 2 shown in FIG. 9, the air in the cylinder is pressurised and heated by the exhaust gas introduced into the cylinder so that a high temperature is established within the cylinder at the beginning of the compression stroke. The compression ignition engine, therefore, can operate even under reduced compression ratio, without suffering from misfiring and emission of white or blue smoke with offensive smell.

It will be clear to those skilled in the art that the same advantage can also be obtained by shifting the timing of closing of the intake valve to a point (c) shown in FIG. 9 by a suitable known measure.

Although the invention has been described through specific terms, it is to be noted here that the described embodiment is not exclusive and various changes and modifications may be imparted thereto without departing from the scope of the invention which is defined by the appended claims.

What is claimed is:

1. A turbo-charged compression ignition engine comprising: a turbo-charger for supercharging said engine, control means for controlling the timing of closing of an inlet passage of said engine, opening means for opening an exhaust valve of said engine at a point near bottom dead centre in the suction stroke, means for varying the area of a nozzle in the turbine of said turbo-charger and said last mentioned means defining a passage openable to the downstream side of said last mentioned means, and an inlet pipe communicating with said last mentioned passage.

2. A turbo-charged compression ignition engine according to claim 1 in which the control means comprises a first shaft drivable by the engine and a second shaft connected to a rotary valve arranged to open or close said inlet passage, the first shaft being arranged to rotate the second shaft through an adjusting member which enables the relative angular position of said shafts to be varied.

3. A turbo-charged compression ignition engine according to claim 2 in which the adjusting member engages splined portions of the first and second shafts, said splined portions being of opposite hand and the adjusting member being tubular and having projections thereon which engage the splined portions so that axial movement of the adjusting member will turn one shaft relative to the other.

4. A turbo-charged compression ignition engine according to claim 3 in which axial movement of the adjusting member is effected by pivoting movement of a lever, said pivoting movement being controlled in response to pressure in the inlet passage downstream of the compressor of the turbo-charger.

5. A turbo-charged compression ignition engine according to claim 4 in which the pivoting movement of the lever operates valve means in the inlet passage to cause air in the inlet passage to pass through or by-pass cooling means.

6. A turbo-charged compression ignition engine according to claim 4 in which the pivoting movement of the lever operates said means for varying the area of the nozzle in the turbine.

7. A turbo-charged compression ignition engine according to claim 1 in which the means for varying the area of the nozzle in the turbine of said turbo-charger comprises a rotor which can be rotated to reduce or increase the area of the nozzle.

8. A turbo-charged compression ignition engine according to claim 7 in which said passage is formed in the rotor and opens to the downstream side of the rotor when the rotor occupies a position in which it reduces the area of the nozzle.

9. A turbo-charged compression ignition engine according to claim 1 in which the opening means comprising a cam having a main cam section for opening the exhaust valve during the normal exhaust stroke and an auxiliary cam section which effects opening of the exhaust valve near bottom dead centre in the suction stroke.

10. An internal combustion engine comprising a turbo-charger for supercharging said engine, control means for controlling the timing of closing of an inlet passage of said engine, opening means for opening an exhaust valve of said engine at a point near bottom dead centre in the suction stroke, means for varying the area of a nozzle in the turbine of said turbo-charger and said last mentioned means defining a passage openable to the downstream side of said last mentioned means, and an inlet pipe communicating with said last mentioned passage.

11. A turbo-charged compression ignition engine according to claim 5 in which the pivoting movement of the lever operates said means for varying the area of the nozzle in the turbine.

* * * * *